United States Patent
Ernst et al.

(10) Patent No.: US 8,366,317 B2
(45) Date of Patent: Feb. 5, 2013

(54) SENSOR FOR DETECTING ELECTROMAGNETIC RADIATION

(75) Inventors: Henrik Ernst, Katzenelnbogen (DE); Hermann Karagözoglu, Wiesbaden (DE); Martin Hausner, Wiesbaden (DE); Guido Lauck, Flörsheim (DE); Jürgen Schilz, Niedernhausen (DE); Fred Plotz, Taunusstein (DE)

(73) Assignee: Excelitas Technologies GmbH & Co. KG, Wiesbaden (DE)

( * ) Notice: Subject to any disclaimer, the term of this patent is extended or adjusted under 35 U.S.C. 154(b) by 456 days.

(21) Appl. No.: 11/569,810

(22) PCT Filed: Jun. 8, 2005

(86) PCT No.: PCT/EP2005/006158
§ 371 (c)(1), (2), (4) Date: Feb. 25, 2008

(87) PCT Pub. No.: WO2005/121727
PCT Pub. Date: Dec. 22, 2005

(65) Prior Publication Data
US 2008/0291968 A1    Nov. 27, 2008

(30) Foreign Application Priority Data
Jun. 9, 2004   (DE) .......................... 10 2004 028 022

(51) Int. Cl.
*G01J 5/00* (2006.01)
*G01J 5/02* (2006.01)

(52) U.S. Cl. .......................... 374/131; 374/130; 250/353

(58) Field of Classification Search .................. 374/121, 374/131, 132, 133, E1.013; 600/474; 250/352–353
See application file for complete search history.

(56) References Cited

U.S. PATENT DOCUMENTS
4,820,923 A * 4/1989 Wellman ....................... 250/352
(Continued)

FOREIGN PATENT DOCUMENTS
CN    1035892 A    9/1989
DE    2 206 642    9/1972
(Continued)

OTHER PUBLICATIONS

Leneke et al., Thermopile-Zeilen-Und Matrixsensor-Arrays Fuer Die Positions-, Anwesenheits-Und Bewegungserkennung, Technisches Messen TM, R. Oldenbourg Verlag. Munchen, DE, Bd. 66, Nr. 3, Mar. 1999, Seiten 104-108, XP000890600, Issn: 0171-8096 (5 pages).

(Continued)

*Primary Examiner* — Lisa Caputo
*Assistant Examiner* — Jonathan Dunlap
(74) *Attorney, Agent, or Firm* — Peter A. Nieves; Sheehan Phinney Bass + Green PA

(57) ABSTRACT

A sensor for detecting electromagnetic radiation comprises a sensor element, a housing in which the sensor element is disposed, and a radiation inlet window provided in the housing and closed by a material transmissible for the radiation to be detected. The transmissible material is fixed to the housing by fixation means not disposed in the field of view of the sensor element.

17 Claims, 1 Drawing Sheet

U.S. PATENT DOCUMENTS

| | | | |
|---|---|---|---|
| 4,937,450 A * | 6/1990 | Wakabayashi et al. | 250/352 |
| 4,990,782 A * | 2/1991 | Wellman et al. | 250/352 |
| 5,056,929 A * | 10/1991 | Watanabe et al. | 374/181 |
| 5,645,349 A | 7/1997 | Fraden | |
| 6,203,194 B1 * | 3/2001 | Beerwerth et al. | 374/133 |
| 6,219,573 B1 * | 4/2001 | Pompei | 600/474 |
| 6,694,174 B2 * | 2/2004 | Kraus et al. | 600/474 |
| 2001/0035496 A1 | 11/2001 | Hasegawa et al. | |
| 2003/0060717 A1 * | 3/2003 | Kraus et al. | 600/474 |
| 2004/0031274 A1 | 2/2004 | Cho et al. | |
| 2004/0076217 A1 | 4/2004 | Lin | |
| 2004/0122338 A1 * | 6/2004 | Pompei | 600/549 |
| 2006/0153272 A1 * | 7/2006 | Chen et al. | 374/121 |
| 2008/0291968 A1 | 11/2008 | Ernst et al. | |

FOREIGN PATENT DOCUMENTS

| | | |
|---|---|---|
| DE | 42 44 607 A1 | 7/1994 |
| DE | 197 10 946 A1 | 9/1998 |
| DE | 102007039228 A1 | 2/2009 |
| EP | 1 039 280 A2 | 9/2000 |
| EP | 1 139 080 A2 | 10/2001 |
| GB | 2 115 143 A | 9/1983 |
| GB | 2 343 246 A | 5/2000 |
| JP | 59034124 A | 2/1984 |
| JP | 1032131 A | 2/1989 |
| JP | 02045434 A | 2/1990 |
| JP | 2124582 A | 5/1990 |
| JP | 03238326 A | 10/1991 |
| JP | 04079406 A | 3/1992 |
| JP | 4-85131 U | 7/1992 |
| JP | 6220413 A | 8/1994 |
| JP | 11218441 A | 8/1999 |
| JP | 2000179965 A | 6/2000 |
| JP | 2606288 Y2 | 10/2000 |
| JP | 2000292253 A | 10/2000 |
| JP | 2003-149045 A | 5/2003 |
| JP | 2003149045 A | 5/2003 |
| JP | 2003344156 A | 12/2003 |
| JP | 2004077462 A | 3/2004 |
| JP | 2004527644 A | 9/2004 |
| WO | 01/88494 A1 | 11/2001 |
| WO | 2004020961 A1 | 3/2004 |
| WO | WO2011120658 A1 | 10/2011 |

OTHER PUBLICATIONS

European Patent Office, International Search Report, Application No. PCT/EP2005/006158, reported Sep. 21, 2005 (4 pages).

European Patent Office, International Preliminary Examination Report, Application No. PCT/EP2005/006158, reported Apr. 28, 2006 (5 pages).

* cited by examiner

SENSOR FOR DETECTING ELECTROMAGNETIC RADIATION

FIELD OF THE INVENTION

The present invention relates to sensors for detecting electromagnetic radiation and, more particularly, to infrared detectors having enhanced properties in case of fluctuations of the ambient temperature.

BACKGROUND OF THE INVENTION

The invention particularly relates to radiation sensors and here preferably radiation sensors designed to measure temperatures by means of an infrared radiation measurement. The actual sensor elements are, in this case, those structures onto which, concretely, the infrared radiation to be measured is incident and which translate it into electrically usable signals, for example a current, a voltage, an electric charge, in a certain manner. They may be thermopiles or pyrodetectors or bolometers.

Particularly thermopiles have the property that their electrical output signal does not only depend on the incident electromagnetic radiation (in the infrared range) but also on the ambient temperature of the environment in which the sensor element works. To disconnect the sensor elements of heat sinks and of the ambient temperature as much as possible thermopiles are arranged on thermally poorly conducting structures as shown, for example, in FIG. 1. The actual sensor element is denoted by the numerals 4 (4a, 4b). It has a hot end 4a and a cold end 4b. Above the hot end 4a an absorption layer 5a may be provided which may, for example, be of a dark colour so that it absorbs the incident infrared radiation (denoted by IR(To)) particularly well and therefore leads to the heating of the hot end 4a. On the other hand, a reflective layer 5b may be disposed above the cold end 4b, said reflective layer 5b reflecting the incident infrared radiation so that the cold end 4b heats up correspondingly less. The temperature difference between the cold and the hot end results in a measurable voltage difference. A plurality of said structures may be connected in series so that a correspondingly higher signal voltage is obtained.

The sensor elements are disposed on a thin membrane 3 which itself is supported by a substrate 1 formed as a frame. The hot ends 4a are, in this case, regularly not disposed above the frame 1 but on the membrane 3 above the orifice 2 of the frame 1. In this way the hot end 4a is thermally separated from the thermal mass of the frame 1 so that the incident infrared radiation can cause a comparably intense heating and thus a strong signal.

If it may be assumed that the ambient temperature (denoted by the arrows Tu under the frame 1 of the sensor element) is constant it is desirable that the cold contacts 4b are provided above the frame 1 and, if and in as far as it is present there, on the membrane 3. Then the heating of the cold contacts by the impinging infrared radiation is low since the cold contacts are coupled to the thermal mass of the frame 1.

If, on the other hand, it has to be assumed that the ambient temperature may change rapidly the cold contacts as well as the hot contact are preferably not provided above the frame 1 but—as shown in FIG. 1—above the orifice 2 in the frame 1 so that also in so far a disconnection of the cold contacts from the changing ambient temperature is effected. A typical field of application for sensor elements or sensors in changing ambient temperatures is the field air conditioning. Here rapid temperature changes of the ambient temperature may occur so that the sensor and its components may also be subjected to said changes of the ambient temperature.

When the temperature conditions of the cold contact are undefined or change this affects the (indirect) temperature measurement through the (direct) measurement of the infrared radiation carried out in accordance with an object temperature To.

For an exact temperature measurement the dynamic properties of the temperature distribution are relevant. To this end the DE 197 10 946 suggests to configure the heat capacities of the cold spots and the hot spots as well as the heat conductivity in the vicinity of the cold spots and the hot spots in a certain way to be described in more detail. An asymmetric arrangement of the hot spots of the thermopile sensor with respect to the housing is suggested to realise an irradiation of only the hot spots. With the measures known from the cited document it is intended to cause the influence of the ambient temperature conditions on the cold spots to be identical to their influence on the hot spots.

From the EP 1 039 280 an infrared sensor comprising a thermopile sensor is known. The sensor comprises a cap into which a window component is integrated. The window component is attached to the cap by means of plastic from the inside.

BRIEF SUMMARY OF THE INVENTION

It is the object of the invention to provide a sensor which is comparatively insusceptible to changes of the ambient temperature of the sensor or sensor element and generally to interfering signal sources.

Said object is solved by the features of the independent claims. The dependant claims relate to preferred embodiments of the invention.

The housing of a sensor may comprise a bottom plate on which the sensor element is mounted as well as side walls and a ceiling which, in most cases, is provided with a radiation inlet window through which the radiation to be detected is incident on the sensor element inside the housing. The side walls and the ceiling are frequently an integral cylinder-like component. The radiation inlet window is closed by a material transmissible for the radiation to be detected and frequently having imaging properties (lens, Fresnel lens, lattice, phase plate). Said material is attached to the housing by fixation means so that the fixation means are not disposed in the field of view of the sensor element.

The material of the radiation inlet window is preferably attached to the housing from the outside so that the fixation means are also disposed on the outside, or it is fixed, in particular by an adhesive, in a groove or recess or swage directed to the outside. In this way the highly radiation-emitting fixation material will not remain in the field of view of the sensor element so that the radiation which it emits and which also depends on the ambient temperature will not interfere with the measuring result.

The inner surfaces positioned inside of the housing in the field of view of the sensor element may be scantly emitting surfaces.

In addition or instead the inner surfaces disposed inside the housing in the field of view of the sensor element may be formed so that no or only a small amount of radiation from the outside is reflected onto the sensor element(s) by the inner surfaces. The inner surfaces may be curved to the outside, i.e. concave. However, convex curvatures are also possible. The arrangement may, in this case in particular, be so that the cross sectional area is larger directly above the sensor element than on the level of the radiation inlet window. In this way it is ensured that ambient radiation entering from the outside which should not be mapped on the sensor element is reflected inside of the housing so that it does not reach the sensor element and thus doesn't affect the temperature measurement.

The sensor is designed to measure infrared radiation or the temperature. It may, for example, be provided in a thermometer, for example in air conditioning. A thermometer comprising a sensor or sensor element according to the present description is to be understood as part of the invention.

BRIEF DESCRIPTION OF THE DRAWINGS

Individual embodiments of the invention will be described below with reference to the appended drawings in which.

DETAILED DESCRIPTION OF THE INVENTION

Figure 2:
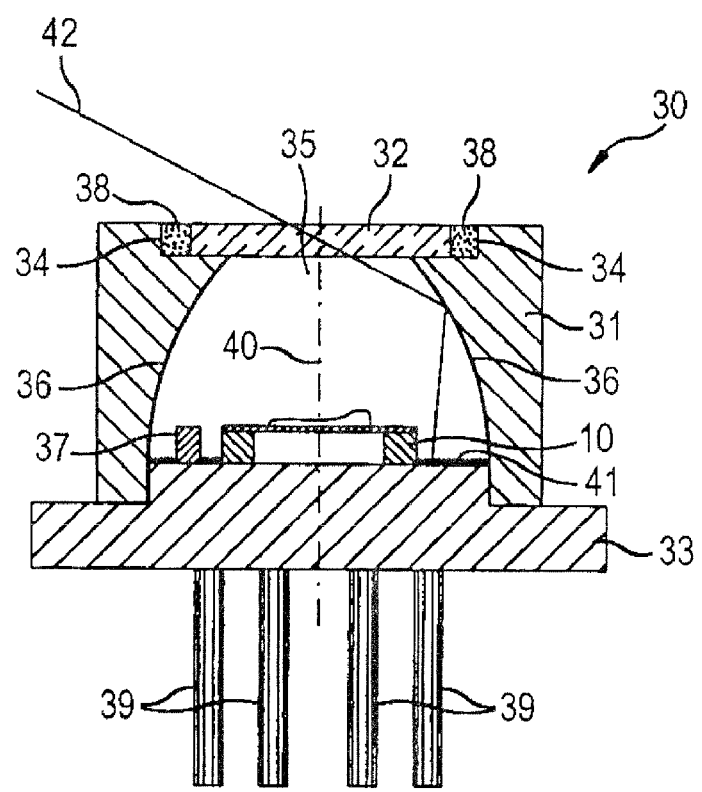
FIG. 2 shows a cross sectional view of a sensor according to the invention.

FIG. 2 shows a cross section through a vertical plane of a sensor. Inside of the sensor 30 a sensor element 10 is provided which is heat-sensitive, particularly for infrared radiation ($\lambda > 800$ nm, preferably $>2$ μm). It may, but doesn't need to be formed as described above. It may, in particular, a thermopile sensor element. Adjacent to the sensor element 10 or directly on the sensor element a temperature reference element 37 may be provided which detects the ambient temperature and converts it into an electric signal which may be used for evaluation and compensation. The sensor element 10 and, if required, the temperature reference element 37 are disposed inside a housing which, in the embodiment shown, comprises a bottom plate 33, side walls 31 and a radiation inlet window 35 closed by a radiation-transmissible material 32.

The housing and particularly the side wall 31 may be formed cylindrically about a cylinder axis 40. The radiation inlet window 35 may be covered by an imaging element formed of a radiation-transmissible material 32. The imaging element may have a collecting or focussing effect. It may, for example, be a phase plate, a lattice, a Fresnel lens or a common lens. The radiation-transmissible material 32 is fixed to the housing by fixation means 38 not located in the field of view of the sensor element 10. Usually the fixation means are an adhesive or a common plastic material having a comparably high radiation emissivity so that they cause particularly intense changes of the radiation in case of variations of the ambient temperature. These do not influence the measurement signal if the fixation means are disposed outside of the field of view of the sensor element 10.

The construction may be so that the material of the radiation inlet window is attached to the housing from the outside so that the fixation means 38 are also disposed on the outside. In particular the material may be inserted into a groove or recess 34 on the outside of the housing and fixed therein by adhesion, for example, as shown between the side wall of the recess 34 and the side wall of the material 32 by means of an adhesive or a synthetic resin or generally plastic 38. It will then not be disposed in the field of view of the sensor 10 so that it cannot contribute to the perturbation of the signal by emitted radiation.

According to a further embodiment of the invention the inner surfaces 36 disposed in the field of view of the sensor element 10 may be scantly emitting or formed of a scantly emitting material so that variations of the ambient temperature which also the housing and particularly its cylindrical part 31 experience are transmitted to the sensor element 10 by radiation inside the sensor only to a small extent. The inner surfaces may have an emissivity of less than 10%, preferably less than 3% of an ideal black radiator.

According to a further embodiment the inner surfaces 36 disposed in the field of view of the sensor element may be globally concave. The design may, in this case, be so that the cross sectional area of the orifice directly above the sensor element 10 is larger than the cross sectional area of the radiation inlet window 35, i.e. so that the inner surfaces 36 narrow from the sensor element 10 towards the radiation inlet window 35 in the direction of the axis of symmetry 40. In this way radiation components originating from beyond the object to be measured are reflected so that they will not reach the sensor element 10. This is illustrated by an exemplary beam path 42. The beam is reflected by the inclined wall 36 so that it will not reach the sensor element 10 but a bottom area adjacent to the sensor element. The bottom area adjacent to the sensor element may be coated with an absorbing material (a "bottom") 41 so that multiple reflections will not occur. The inner surfaces 36 are then reflective.

The geometry, however, may also be so that they open or widen towards the upper side, particularly when the inner surfaces provided inside of the housing within the field of view of the sensor element 10 are formed so that no or only a small amount radiation from the outside is reflected onto the sensor element(s) via the inner surfaces. The inner surfaces may be globally curved to the outside, i.e. concave. However, globally convex curvatures are also possible.

The inner surfaces 36 may be the surfaces of a massive housing body 31 which may, for example, be formed as a rotating part. However, it may, for example, also be the mirrored inner surfaces 36 of a die-cast part which may, if required, covered by a metallic cap for increasing the mechanic stability, or the inner surfaces 36 may be formed by a separate component being inserted into the inside of the housing independent of the outer housing and forming the inner surfaces 36 of the sensor cavity at least as seen from the sensor element 10.

39 denotes the terminals of the sensor for outputting the signals of the sensor element 10 and, if required, the temperature reference element 37. In case of a multi-element sensor correspondingly a plurality of electrically separately readable sensor elements may be provided which may be mounted on a common membrane 3 above a common frame 1 or on a membrane above separate pits of a common substrate. In this case a plurality of terminals may be provided. Together with the sensor element or the plurality of sensor elements further electronic signal processing circuits may be mounted either on the elements themselves or adjacent to the sensor element.

As described above the housing may, in particular, be heat-conducting. It may have a heat conductivity which is at least 20%, preferably at least 50% of the heat conductivity of pure copper.

The element 32 closing the radiation inlet window 35 may be a phase plate preferably produced by etching. In this case regionally different thicknesses arranged concentrically with respect to each other lead to different paths of the radiation parts leaving the phase plate so that a, in a certain manner wave-length-selective, collection of the entering radiation on the sensor element is effected due to superimposition/interference. The element 32 may also be or comprise a lens or a Fresnel lens or a focussing mirror.

The outer dimensions of the sensor may correspond to a standardised housing, for example a TO5 housing, or the sensor may comprise such a housing.

Figure 1:
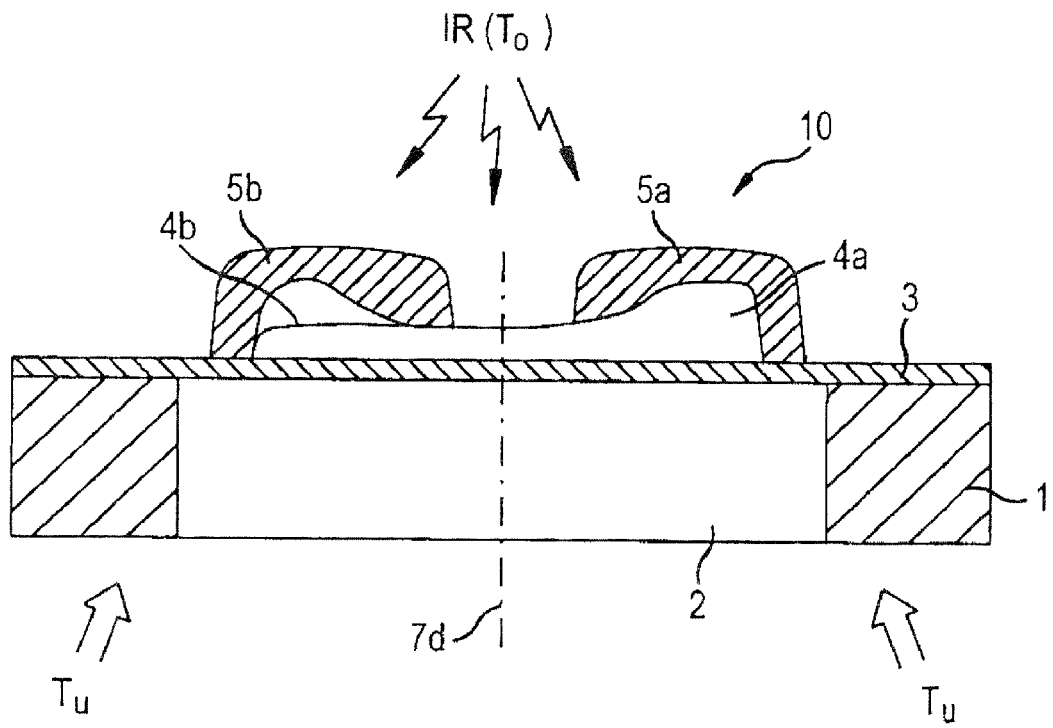
FIG. 1 shows a cross sectional view of a sensor element.

The sensor element may be or comprise one or more thermopiles. These comprise cold and hot contacts. The hot contacts may be disposed on a membrane above the orifice of the frame. The cold contacts may be disposed above the orifice of the frame or on or above the frame. Absorption and/or reflective layers may be provided as described with reference to FIG. 1.

Having described the invention, we claim:

1. Sensor for detecting electromagnetic radiation, particularly in the infrared range, comprising:
    one or more sensor elements for detecting electromagnetic radiation,
    a housing in which the sensor element is disposed, wherein inner surface of the housing are curved to the outside in a vertical cross-section and are provided in a field of view of the sensor element; and
    a radiation inlet window provided in the housing and closed by a material transmissible for the radiation to be detected,
    wherein the transmissible material is fixed to the housing by a fixation means that is disposed outside of the field of view of the sensor element, and that has a comparably high radiation emissivity.

2. Sensor according to claim 1, wherein the material of the radiation inlet window is fixed to the housing from the outside or in a groove or recess of the housing directed to the outside.

3. Sensor according to claim 1 or 2, wherein the housing is heat-conducting and, in particular, has a heat conductivity which amounts to at least 20%, preferably at least 50% of the heat conductivity of pure copper.

4. Sensor according to claim 1 or 2 wherein the fixation means consist of plastic or an adhesive.

5. Sensor according to claim 1, wherein scantly emitting inner surfaces are provided in the field of view of the sensor element inside the housing.

6. Sensor according to claim 5, wherein the inner surfaces are reflective.

7. Contact-free temperature measuring device comprising a sensor according to claim 1.

8. The sensor according to claim 1, wherein the inner surfaces of the housing in the field of view of the sensor element are formed so that no amount of radiation from outside the sensor is reflected onto the sensor element by the inner surface.

9. The sensor according to claim 1, wherein the inner surfaces of the housing in the field of view of the sensor element are formed so that only a small amount of radiation from outside the sensor is reflected onto the sensor element by the inner surface.

10. The sensor according to claim 1, wherein the sensor element is located on a bottom plate of the housing.

11. Sensor for detecting electromagnetic radiation, particularly in the infrared range, comprising:
    one or more sensor elements for detecting electromagnetic radiation;
    a housing in which the sensor element is disposed; and
    a radiation inlet window provided in the housing,
    wherein inner surfaces of the housing are globally concave in a vertical cross section and are provided in the field of view of the sensor element inside the housing.

12. Sensor according to claim 11, wherein the inner surfaces define a cavity the cross sectional area of which is smaller at the radiation inlet window than directly above the sensor element.

13. Sensor according to claim 11, wherein the inner surfaces form the surface of an auxiliary body inside the housing.

14. Sensor according to claim 11, wherein the housing comprises a rotating part.

15. Sensor according to claim 14, wherein the inner surfaces are a surface of the rotating part.

16. Sensor according to claim 11, wherein the area inside the housing adjacent to the sensor element is coated by a radiation-absorbing material.

17. Contact-free temperature measuring device comprising a sensor according to claim 11.

* * * * *